(12) United States Patent
Ramamurthy et al.

(10) Patent No.: US 11,169,045 B2
(45) Date of Patent: Nov. 9, 2021

(54) METHODS AND SYSTEMS FOR DETERMINING RESIDUAL LIFE OF A SWIVEL

(71) Applicant: OPW-Engineered Systems, Inc., Lebanon, OH (US)

(72) Inventors: Gautham Ramamurthy, Bangalore (IN); Chandra Sekhar Panda, Bangalore (IN); Ishank Kumar Rawat, Bangalore (IN); Srishti Tiwari, Bangalore (IN); Anvith Bannur Gopinath, Bangalore (IN); Phaneendra Govindasetty Tirumani, Bangalore (IN); Don Johnson, Lebanon, OH (US)

(73) Assignee: KNAPPCO, LLC, Hamilton, OH (US)

( * ) Notice: Subject to any disclaimer, the term of this patent is extended or adjusted under 35 U.S.C. 154(b) by 177 days.

(21) Appl. No.: 16/225,412

(22) Filed: Dec. 19, 2018

(65) Prior Publication Data

US 2019/0187022 A1 Jun. 20, 2019

(30) Foreign Application Priority Data

Dec. 19, 2017 (IN) .............................. 201741045526

(51) Int. Cl.
*G01M 3/28* (2006.01)
*G06T 7/215* (2017.01)
*F16L 27/08* (2006.01)

(52) U.S. Cl.
CPC ........... *G01M 3/2853* (2013.01); *G06T 7/215* (2017.01); *F16L 27/08* (2013.01); *F16L 27/0804* (2013.01); *G06T 2207/10016* (2013.01)

(58) Field of Classification Search
CPC .................. G01N 2203/005; G01N 2203/006
See application file for complete search history.

(56) References Cited

U.S. PATENT DOCUMENTS 4,692,699 A * 9/1987 Brunet ................ F16C 32/0446
310/90.5
5,033,010 A * 7/1991 Lawrence .......... G05B 23/0264
701/31.4
(Continued)

FOREIGN PATENT DOCUMENTS

DE 19609106 A1 * 9/1996 ........... F16D 48/066
EP 1873498 A1 * 1/2008 ............ B60J 7/0573
(Continued)

OTHER PUBLICATIONS

Margery E. Hoffman et al., "Corrosion and fatigue research—structural issues and relevance to naval aviation", International Journal of Fatigue, vol. 23, Supplement 1, 2001. (Year: 2001).*

(Continued)

*Primary Examiner* — David A. Rogers
(74) *Attorney, Agent, or Firm* — Workman Nydegger

(57) ABSTRACT

A system and method for determining a residual life of a swivel. The method includes determining at least one of an angular rotation, a linear displacement and a rotational direction of at least one swivel and determining rotational count of the at least one swivel based on the determined at least one of the angular rotation, the linear displacement and the rotational direction of the at least one swivel. Further, the method includes indicating a residual life information of the at least one swivel based on the determined rotational count of the at least one swivel. Further, the embodiments herein also provide an electronic device for determining residual life of a swivel.

6 Claims, 6 Drawing Sheets

(56) References Cited

U.S. PATENT DOCUMENTS

| | | | | | |
|---|---|---|---|---|---|
| 5,210,704 | A | * | 5/1993 | Husseiny | G01H 1/003 702/34 |
| 5,448,924 | A | * | 9/1995 | Nagai | G01D 21/02 73/865.9 |
| 5,696,444 | A | * | 12/1997 | Kipp | F04D 15/0088 324/207.16 |
| 5,712,478 | A | * | 1/1998 | Olsson | G01B 7/004 250/231.13 |
| 5,723,779 | A | * | 3/1998 | Hara | F16D 48/066 340/454 |
| 5,753,799 | A | * | 5/1998 | Shah | F16L 27/0828 73/40 |
| 5,851,034 | A | * | 12/1998 | Shah | F16L 27/08 285/16 |
| 6,003,872 | A | * | 12/1999 | Nord | F16J 15/3296 277/317 |
| 6,040,768 | A | * | 3/2000 | Drexl | F16D 48/06 340/453 |
| 6,209,390 | B1 | * | 4/2001 | LaRue | G07C 3/00 73/112.01 |
| 6,297,742 | B1 | * | 10/2001 | Canada | G01R 31/343 318/490 |
| 6,449,565 | B1 | * | 9/2002 | Budrow | G07C 3/00 378/72 |
| 6,879,240 | B2 | * | 4/2005 | Kruse | B60G 7/005 338/12 |
| 7,194,384 | B2 | * | 3/2007 | Olsson | G01M 13/021 702/185 |
| 7,328,625 | B2 | * | 2/2008 | Sundermeyer | G01N 3/32 73/806 |
| 7,405,557 | B2 | * | 7/2008 | Spratte | B60G 7/005 324/207.22 |
| 7,433,789 | B1 | * | 10/2008 | Balestra | G01M 5/0033 702/184 |
| 7,844,428 | B2 | * | 11/2010 | Olsson | G07C 3/00 703/7 |
| 7,908,928 | B2 | * | 3/2011 | Vik | G01M 5/0041 73/806 |
| 7,949,479 | B2 | * | 5/2011 | Brown | G07C 3/00 702/34 |
| 8,210,469 | B2 | * | 7/2012 | Nitzsche | B64C 27/001 244/17.13 |
| 8,393,632 | B2 | * | 3/2013 | Vortmeyer | B60D 1/06 280/511 |
| 8,472,837 | B2 | * | 6/2013 | Ishii | G03G 21/1676 399/111 |
| 8,478,479 | B2 | * | 7/2013 | Ghelam | G06F 11/008 701/31.9 |
| 8,504,308 | B2 | * | 8/2013 | Li | E21B 47/007 702/34 |
| 8,600,611 | B2 | * | 12/2013 | Seize | G01M 5/0033 701/33.2 |
| 8,839,680 | B2 | * | 9/2014 | Anderson | G01N 3/56 73/843 |
| 9,018,781 | B2 | * | 4/2015 | Krug | H02P 9/006 290/44 |
| 9,310,801 | B2 | * | 4/2016 | Frydendal | G05B 23/0221 |
| 9,671,314 | B2 | * | 6/2017 | Followell | B64F 5/60 |
| 9,856,932 | B2 | * | 1/2018 | Versteyhe | F16D 48/062 |
| 10,266,017 | B2 | * | 4/2019 | Ornella | B60C 23/003 |
| 10,281,004 | B2 | * | 5/2019 | Mupende | F16G 11/00 |
| 10,533,306 | B2 | * | 1/2020 | Sherlock | E02F 9/267 |
| 10,663,357 | B2 | * | 5/2020 | Okulov | G01M 5/0083 |
| 10,968,605 | B2 | * | 4/2021 | Kawamura | E02F 9/2275 |
| 2004/0025595 | A1 | * | 2/2004 | Brennan | G01M 5/0083 73/787 |
| 2007/0277613 | A1 | * | 12/2007 | Iwatsubo | G01M 13/045 73/593 |
| 2009/0287448 | A1 | * | 11/2009 | Brown | G07C 3/00 702/130 |
| 2010/0013594 | A1 | * | 1/2010 | Komine | G05B 19/0428 340/5.8 |
| 2010/0100338 | A1 | * | 4/2010 | Vik | G01M 5/0033 702/42 |
| 2011/0026968 | A1 | * | 2/2011 | Ishii | G03G 21/1676 399/111 |
| 2012/0217726 | A1 | * | 8/2012 | Vortmeyer | B60D 1/58 280/511 |
| 2014/0012527 | A1 | * | 1/2014 | Yamamoto | G07C 3/00 702/82 |
| 2014/0324377 | A1 | * | 10/2014 | Fenn | G01M 17/00 702/113 |
| 2015/0124925 | A1 | * | 5/2015 | Falzarano | G07C 3/10 377/15 |
| 2017/0107700 | A1 | * | 4/2017 | Faivre | E02F 9/265 |
| 2017/0350785 | A1 | * | 12/2017 | Greaves | G01M 5/0033 |
| 2018/0073945 | A1 | * | 3/2018 | Kai | G01L 1/2287 |
| 2018/0282975 | A1 | * | 10/2018 | Kawamura | F16L 27/0804 |
| 2018/0373966 | A1 | * | 12/2018 | Beschorner | G01C 21/16 |
| 2019/0107824 | A1 | * | 4/2019 | Oohara | G05B 19/4065 |

FOREIGN PATENT DOCUMENTS

| | | | | |
|---|---|---|---|---|
| EP | 2902584 | A2 * | 8/2015 | E21B 17/01 |
| JP | 2013023865 | A * | 2/2013 | |

OTHER PUBLICATIONS

A. Fatemi et al., "Cumulative fatigue damage and life prediction theories: a survey of the state of the art for homogeneous materials", International Journal of Fatigue, vol. 20, No. 1, 1998. (Year: 1998).*

* cited by examiner

METHODS AND SYSTEMS FOR DETERMINING RESIDUAL LIFE OF A SWIVEL

RELATED APPLICATION

The present invention claims benefit of the Indian Provisional Application No. 201741045526 titled "SYSTEM AND METHOD FOR DETECTING LIFE OF SWIVEL" filed on Dec. 19, 2017, which is herein incorporated in its entirety by reference for all purposes.

FIELD

The present invention relates to a swivel and more particularly related to determining a life of the swivel to perform a predictive maintenance when the swivel is approaching its end of life.

BACKGROUND

The swivels are generally used to make movable pipe arrangements for the transport of liquids and gasses. There are various types of swivel with varying materials and configurations. The swivel comprises of multiple rotating parts and the parts of the swivel are sealed to prevent leakage of the liquids and the gasses. The swivel parts are mostly lubricated to enhance the life of the swivel. The Swivel's life is approximately hundred thousand cycles and after the expiry of hundred thousand cycles, the seals in the swivel wear out which causes leakage. Generally, it is very difficult to identify, when the swivel reaches the end of life. This results in the leakage of the liquids and the gasses from the Swivel, when the swivel is used beyond its life.

In most applications, the swivel could be carrying inflammable or hazardous fluids. In such cases the leakages could lead to potential safety hazards to the operators or could be dangerous to the environment. Therefore, it is very much necessary to identify the condition of the swivel to determine end of life of the swivel to perform preventive maintenance.

SUMMARY

The principal object of the embodiments herein is to disclose a methods and systems for determining residual life of a swivel.

Accordingly, the embodiments herein provide a swivel residual life detector and method for determining a residual life of a swivel. The method includes determining at least one of an angular rotation, a linear displacement and a rotational direction of at least one swivel. Further, the method includes determining rotational count of the at least one swivel based on the determined at least one of the angular rotation, the linear displacement and the rotational direction of the at least one swivel. The rotational count includes at least one of a partial rotation and a complete rotation of the at least one swivel. Further, the method includes indicating a residual life information of the at least one swivel based on the determined rotational count of the at least one swivel, wherein the residual life information includes remaining number rotations for the at least one swivel.

In an embodiment, the method further includes indicating a visual alarm when the at least one swivel is nearing an end of its design life.

In an embodiment, the method further includes transmitting the residual life information of the at least one swivel to at least one connected device through a wireless communication.

Accordingly, the embodiments herein provide a method and an electronic device for determining residual life of a swivel. The method includes receiving a plurality of frames of at least one swivel from a swivel monitoring unit, wherein the swivel monitoring unit is placed in line of sight with the at least one swivel. Further, the method includes generating a mask image for the received plurality of frames to identify at least one moving object in the plurality of frames, wherein the mask image is generated by identifying at least one of at least one stationary object and at least one moving object present in the received plurality of frames. Further, the method includes generating an intermediate frame by overlaying the mask image on at least one frame captured from a live feed of the swivel monitoring unit. Further, the method includes detecting a predefined pattern on the intermediate frame to identify an actual object of interest to generate a final mask image, wherein the final mask image includes the actual object of interest. Further, the method includes determining the predefined pattern on every frame of the live feed captured by the swivel monitoring unit by overlapping the generated final mask image on every frame of the live feed. Further, the method includes determining rotational count of the at least one swivel based on a pixel intensity variation of the predefined pattern on every frame of the live feed.

In an embodiment, wherein the method further includes indicating, by a display unit, a residual life information of the at least one swivel based on the determined rotational count of the at least one swivel, wherein the residual life information includes remaining number of rotations for the at least one swivel In an embodiment, wherein the method further includes indicating, by the display unit, a visual alarm when the at least one swivel is nearing an end of its design life.

In an embodiment, wherein generating the mask image for the received plurality of frames to identify at least one moving object in the plurality of frames includes determining at least one of the at least one moving object and at least one stationary object present in the received plurality of frames of the at least one swivel; and generating the mask image with the identified at least one moving object for the received plurality of frames by subtracting the at least one stationary object in the received plurality of frames.

Accordingly, the embodiments herein provide a swivel residual life detector for determining a residual life of a swivel. The swivel residual life detector includes a sensor unit configured to measure/determine at least one of an angular rotation, a linear displacement and rotational direction of at least one swivel. Further, the swivel residual life detector includes a microcontroller unit configured to process the measured at least one of the angular rotations, the linear displacement and the rotational direction of the at least one swivel to determine an actual rotational count of the at least one swivel in terms of cycles. The rotational count includes at least one of a partial rotation and a complete rotation of the at least one swivel. Further, the swivel residual life detector includes a display unit configured to display remaining/residual life information of the at least one swivel in terms of cycles or remaining number of rotations based on the determined actual rotational count of the at least one swivel. Further, the display unit configured to provide a visual alarm, when the at least one swivel is nearing an end of its design life. Further, the display unit can be configured to transmitting the residual life information of the at least one swivel to at least one connected device through a wireless communication.

Accordingly, the embodiments herein provide an electronic device for determining residual life of a swivel. The electronic device includes an input receiving unit configured to receive a plurality of frames of at least one swivel from a swivel monitoring unit, wherein the swivel monitoring unit is placed in line of sight with the at least one swivel. Further, the electronic device includes a background extraction unit configured to generate a mask image for the received plurality of frames to identify at least one moving object in the plurality of frames, wherein the mask image is generated by identifying at least one of at least one stationary object and at least one moving object present in the received plurality of frames. Further. The electronic device includes an intermediate frame generating unit configured to generate an intermediate frame by overlaying the mask image on at least one frame captured from a live feed of the swivel monitoring unit. Further, the electronic device includes a pattern matching unit configured to detect a predefined pattern on the intermediate frame to identify an actual object of interest to generate a final mask image, wherein the final mask image includes the actual object of interest. Further, pattern matching unit configured to determine the predefined pattern on every frame of the live feed captured by the swivel monitoring unit by overlapping the generated final mask image on every frame of the live feed. Further, the electronic device includes a rotational counter unit configured to determine rotational count of the at least one swivel based on a pixel intensity variation of the predefined pattern on every frame of the live feed. Further, the electronic device includes a display unit configured to indicate a residual life information of the at least one swivel based on the determined rotational count of the at least one swivel, wherein the residual life information includes remaining number rotations for the at least one swivel.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
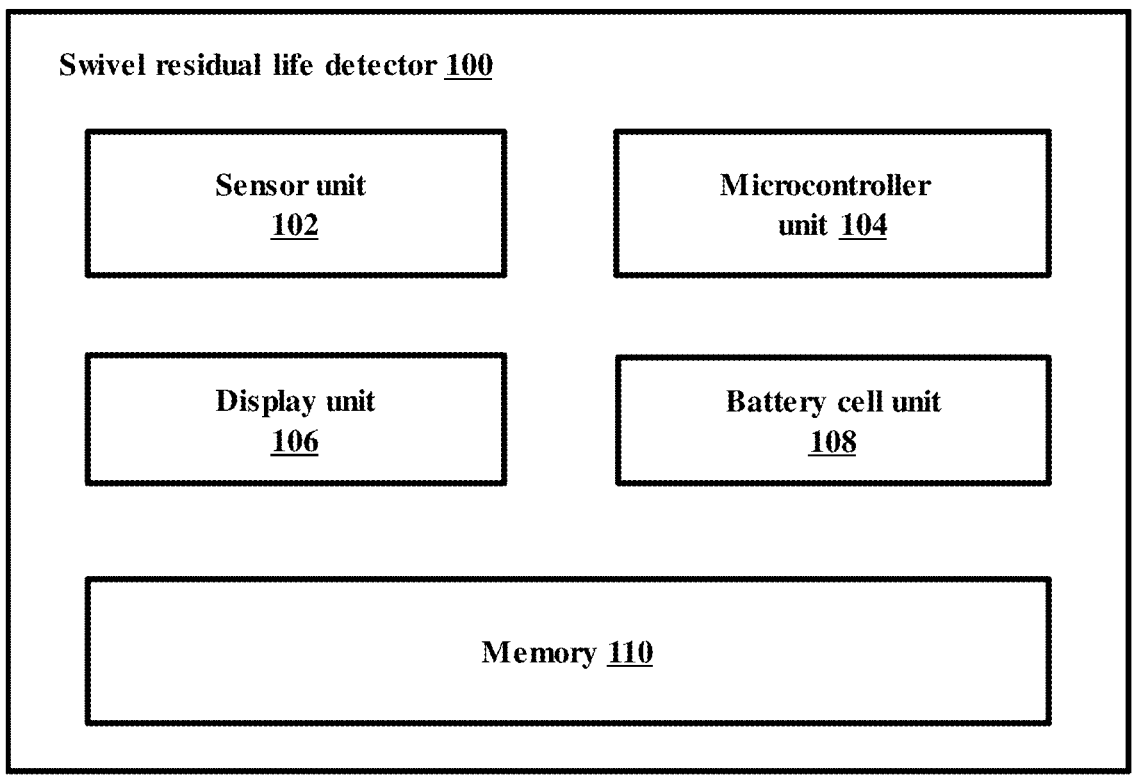
FIG. 1 is a block diagram illustrating various units of a swivel residual life detector, according to an embodiment as disclosed herein.

The example embodiments herein and the various features and advantageous details thereof are explained more fully with reference to the non-limiting embodiments that are illustrated in the accompanying drawings and detailed in the following description. Descriptions of well-known components and processing techniques are omitted, so as not to unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Accordingly, the embodiments herein provide a swivel residual life detector and method for determining a residual life of a swivel. The method includes determining at least one of an angular rotation, a linear displacement and a rotational direction of at least one swivel. Further, the method includes determining rotational count of the at least one swivel based on the determined at least one of the angular rotation, the linear displacement and the rotational direction of the at least one swivel. The rotational count includes at least one of a partial rotation and a complete rotation of the at least one swivel. Further, the method includes indicating a residual life information of the at least one swivel based on the determined rotational count of the at least one swivel, wherein the residual life information includes remaining number rotations for the at least one swivel.

Further, the embodiments herein also provide a method and an electronic device for determining residual life of a swivel. The method includes receiving a plurality of frames of at least one swivel from a swivel monitoring unit, wherein the swivel monitoring unit is placed in line of sight with the at least one swivel. Further, the method includes generating a mask image for the received plurality of frames to identify at least one moving object in the plurality of frames, wherein the mask image is generated by identifying at least one of at least one stationary object and at least one moving object present in the received plurality of frames. Further, the method includes generating an intermediate frame by overlaying the mask image on at least one frame captured from a live feed of the swivel monitoring unit. Further, the method includes detecting a predefined pattern on the intermediate frame to identify an actual object of interest to generate a final mask image, wherein the final mask image includes the actual object of interest. Further, the method includes determining the predefined pattern on every frame of the live feed captured by the swivel monitoring unit by overlapping the generated final mask image on every frame of the live feed. Further, the method includes determining rotational count of the at least one swivel based on a pixel intensity variation of the predefined pattern on every frame of the live feed. Referring now to the drawings, and more particularly to FIGS. 1 through 6, where similar reference characters denote corresponding features consistently throughout the figures, there are shown example embodiments.

FIG. 1 is a block diagram illustrating various units of the swivel residual life detector 100, according to an embodiment as disclosed herein.

The embodiments herein provide the swivel residual life detector 100 includes a sensor unit 102, a microcontroller unit 104, a display unit 106, a battery cell unit 108 and a memory 110. The senor unit 102 further includes a Gyroscope sensor, an accelerometer sensor and an Inertial measurement unit (IMU). The sensor unit 102 can be configured to measure/determine at least one of an angular rotation, a linear displacement and rotational direction of the swivel(s). Further, the microcontroller unit 104 can be configured to process the measured at least one of the angular rotations, the linear displacement and the rotational direction of the swivel(s) to determine an actual rotational count of the swivel(s) in terms of cycles. The rotational count includes at least one of a partial rotation and a complete rotation of the at least one swivel. The step size of angular movement can be as low as 5 degrees. Further, the display unit 106 can be configured to display remaining/residual life information of the swivel(s) in terms of cycles or remaining number of rotations based on the determined actual rotational count of the swivel(s). One complete cycle/rotation corresponds to a 360-degree rotation (i.e., complete rotation) of the swivel(s). For example, if the swivel rotates 180 degrees, then it will be counted as a 0.5 cycle (i.e., partial rotation). Further, the display unit 106 can be configured to provide a visual alarm, when the swivel is nearing an end of its design life. Further, the display unit 106 can be configured to transmitting the residual life information of the swivel(s) to at least one connected device through a wireless communication. The device can be at least one of but not limited to a mobile phone, personal digital assistant (PDA), a smart watch, a smartphone, a laptop and a computer or the like. The battery cell unit 108 can be configured to act as a power source to the swivel residual life detector 100.

The memory unit 110 can be configured to store the measured at least one of the angular rotations, the linear displacement and the rotational direction of the swivel(s). Further, the memory unit 110 can be configured to store the residual life information of the swivel(s). The memory 110 may include one or more computer-readable storage media. The memory 110 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 110 may, in some examples, be considered a non-transitory storage medium. The term "non-transitory" may indicate that the storage medium is not embodied in a carrier wave or a propagated signal. However, the term "non-transitory" should not be interpreted to mean that the memory 110 is non-movable. In some examples, the memory 110 can be configured to store larger amounts of information than the memory. In certain examples, a non-transitory storage medium may store data that can, over time, change (e.g., in Random Access Memory (RAM) or cache).

FIG. 1 shows exemplary units of the swivel residual life detector 100, but it is to be understood that other embodiments are not limited thereon. In other embodiments, the swivel residual life detector 100 may include one or more number of units. Further, the labels or names of the units are used only for illustrative purpose and does not limit the scope of the embodiments herein. One or more units can be combined to perform same or substantially similar function in the swivel residual life detector 100.

Figure 2:
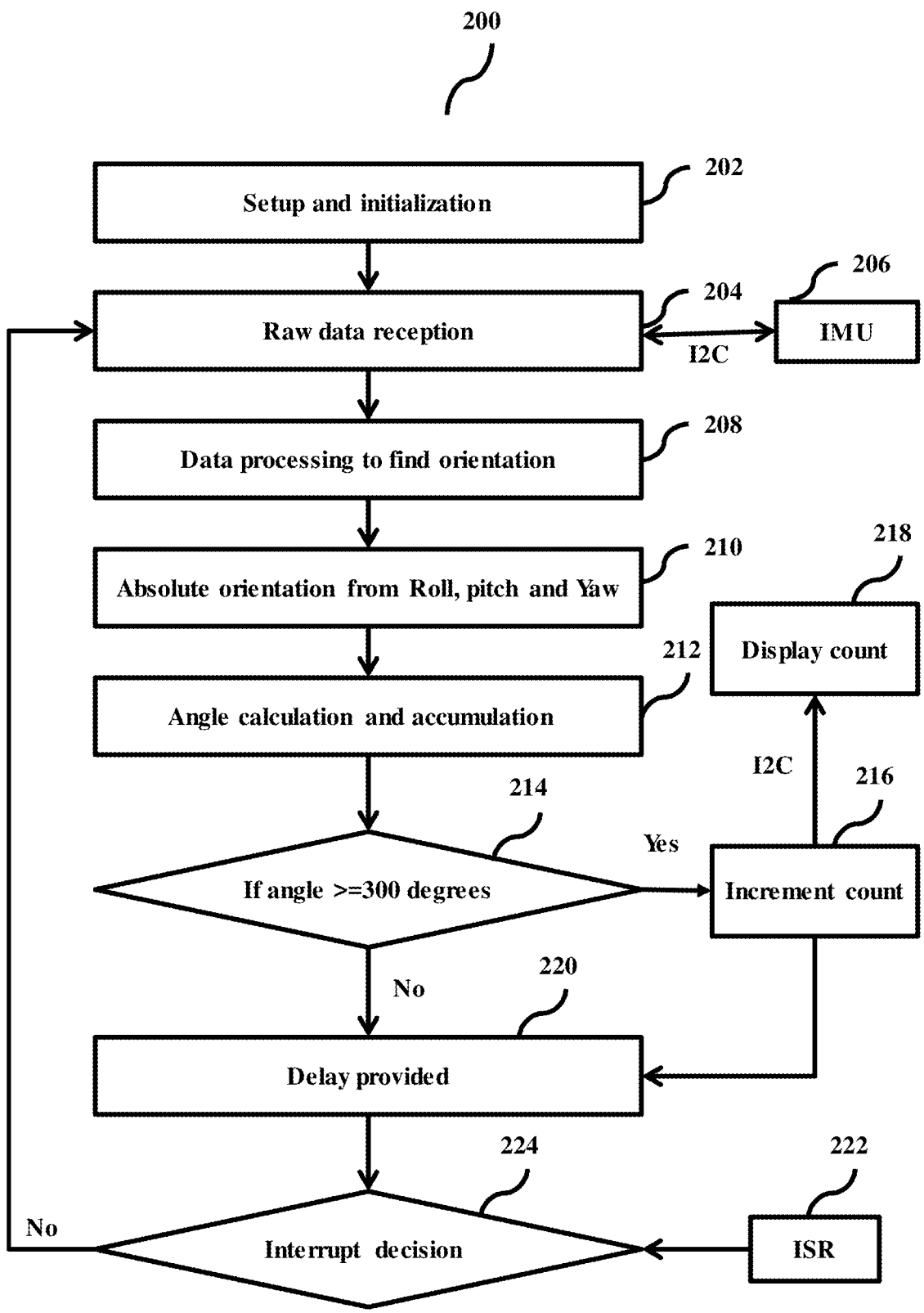
FIG. 2 is a flowchart illustrating a method of determining the life of the swivel using the swivel residual life detector, according to an embodiment as disclosed herein.

FIG. 2 is a flowchart 200 illustrating a method of determining the life of the swivel using the swivel residual life detector 100, according to an embodiment as disclosed herein.

At step 202, the method includes initialization of the sensor unit 102 (i.e. initialization of the gyroscope sensor, accelerometer sensor and the IMU) to receive the raw data from the swivel(s). The method allows the swivel residual life detector 100 to initialize the sensor unit 102 receive the raw data from the swivel(s).

At step 204, the method includes receiving the raw data from the sensor unit 102 through an Inter-Integrated Circuit (I2C). The raw data includes at least one of the angular rotation, the linear displacement and the rotational direction of the swivel(s). The sensor unit 102 includes the IMU (206), which consists of gyroscope sensor and accelerometer sensors connected to the micro controller unit 104 through the I2C, which is configured to measure orientation, position, and velocity of the swivel(s). The method allows the micro controller unit 104 to receive the raw data from the sensor unit 102 through I2C.

At step 208, the method includes processing the received raw data to determine an orientation of the swivel(s). Further, at step 210, the method includes determining an absolute orientation based on roll, pitch and yaw of the swivel(s). The method allows the micro controller unit 104 to process the received raw data to find an orientation of the swivel(s). Further, the micro controller unit 104 can be configured to determine an absolute orientation of the swivel(s) based on roll, pitch and yaw of the determined orientation of the swivel(s).

At step 212, the method includes determining the angular rotation of the swivel(s) based on the determined absolute orientation. Further, the angular rotation is determined/calculated continuously based on the absolute orientation of the swivel(s) and the same can be stored in a buffer register of the memory 110.

At step 214, the method includes determining whether the angular rotation of the swivel(s) is more than or equal to 360 degree. If the determined angular rotation of the swivel(s) is more than 360 degree, then at step 216, the count is incremented by one and the buffer registered value is set to zero. Further, at step 218, incremented count value is displayed on the display unit 106. Further, if the determined angular rotation of the swivel(s) is less than 360 degree, then at step 220, a small delay is provided.

At step 224, the method includes checking for interrupts, in case of any interrupts, an interrupt system (not shown) can signal the microcontroller unit 104 to suspend processing a current instruction sequence. Further, at step 222, the interrupt system can signal the microcontroller unit 104 to begin an interrupt service routine (ISR) (222). Further, incase, if there are no interrupts, then the control is back to step 204.

The various actions, acts, blocks, steps, or the like in the method and the flow diagram 200 may be performed in the order presented, in a different order or simultaneously. Further, in some embodiments, some of the actions, acts, blocks, steps, or the like may be omitted, added, modified, skipped, or the like without departing from the scope of the invention.

Figure 3A:
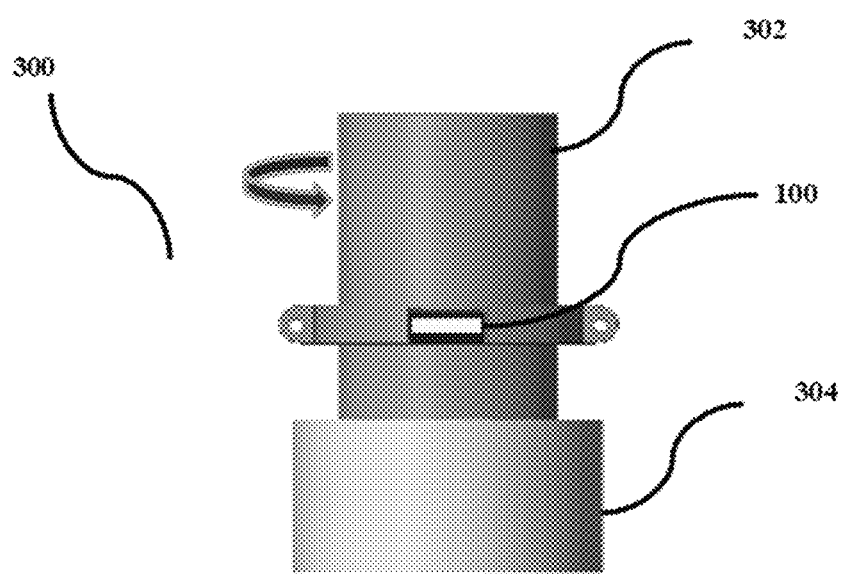
FIG. 3a illustrates a side-view and perspective view of a swivel(s), according to an embodiment as disclosed herein.
Figure 3B:
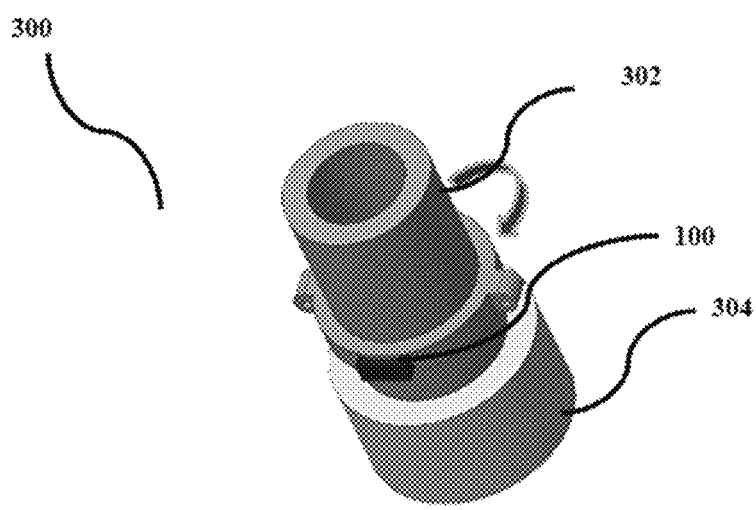
FIG. 3b illustrates another side-view and perspective view of a swivel(s), according to an embodiment as disclosed herein.

FIGS. 3a and 3b illustrates a side-view and perspective view of a swivel(s) 300, according to an embodiment as disclosed herein.

The swivel(s) 300 includes stationary part 304 and rotary part 302. The swivel residual life detector 100 can be integrated into the rotary part 302 of the swivel(s) 300, According to an embodiment of the present invention, the sensor unit 102 is provided with the IMU, wherein the IMU further incudes the accelerometer sensor and the gyroscope sensors, wherein the accelerometer sensor can determine/measure the linear motion/displacement and the gyroscope sensor can sense the angular rotation. Further, the microcontroller unit 104 can be configured to determine rotational count of the swivel(s) based on the determined/measured at least one of an angular rotation, a linear displacement and a rotational direction of the at least one swivel. Further, the display unit 106 can be configured to indicate the residual life information of the at least one swivel based on the determined rotational count of the swivel(s). The residual life information includes remaining number rotations/cycles for the swivel(s). The swivel residual life detector 100 is attached to the rotary part 302 with the help of clamp to measure the off-axis rotation and the rotary part 302 is connected to the stationary part 304 of the swivel(s).

Figure 4:
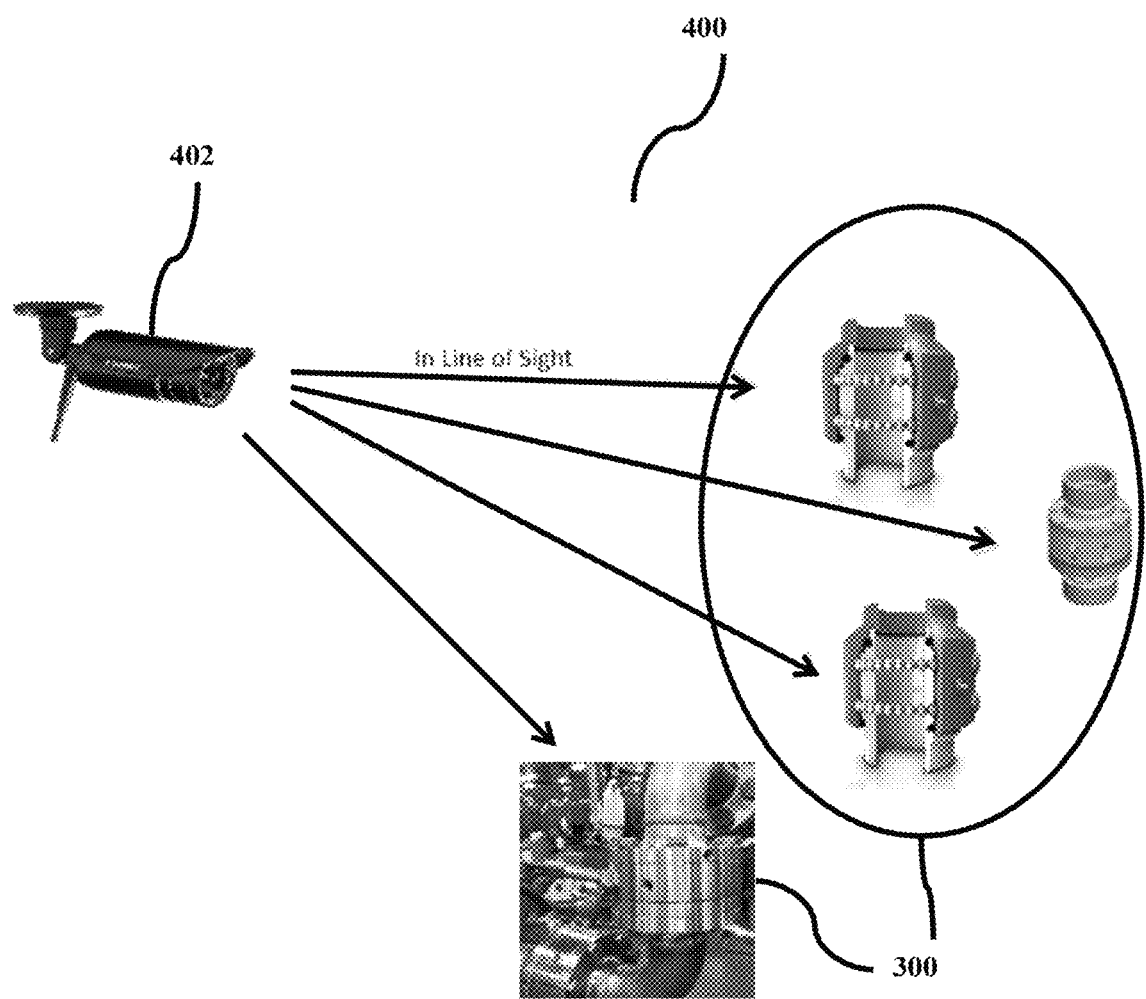
FIG. 4 is a schematic diagram illustrating overview of a method and a system for detecting a life of a swivel, according to an embodiment as disclosed herein.

FIG. 4 is a schematic diagram illustrating overview of a method and a system 400 for detecting a life of a swivel, according to an embodiment as disclosed here in.

The system 400 includes the swivel(s) 300, a swivel monitoring unit 402 and an electronic device (not shown). The swivel monitoring unit 402 can monitor swivel(s) 300 available in the line of sight. The swivel monitoring unit 402 can be configured to continuously monitor the swivel(s) 300 and corresponding rotations performed by the swivel(s) 300. The swivel monitoring unit 402 can be at least one of but not limited to a camera, a video recorder, a multimedia recording device or any other electronic device which has the capability to capture videos. Further, the electronic device can be configured to determine the number of rotations performed by the swivel(s) to determine the residual life of the swivel(s) 300.

The embodiments herein provide a method for determining residual life of the swivel by an electronic device. The method includes receiving a plurality of frames of a swivel(s) from a swivel monitoring unit 402. The swivel monitoring unit 402 is placed in line of sight with the swivel(s). Further, the method includes generating a mask image for the received plurality of frames to identify at least one moving object in the plurality of frames, wherein the mask image is generated by identifying at least one of at least one stationary object and at least one moving object present in the received plurality of frames. Further, the method includes generating an intermediate frame by overlaying the mask image on at least one frame captured from a live feed of the swivel monitoring unit 402. Further, the method includes detecting a predefined pattern on the intermediate frame to identify an actual object of interest to generate a final mask image, wherein the final mask image includes the actual object of interest. Further, the method includes determining the predefined pattern on every frame of the live feed captured by the swivel monitoring unit by overlapping the generated final mask image on every frame of the live feed. Further, the method includes determining rotational count of the swivel based on a pixel intensity variation of the predefined pattern on every frame of the live feed.

The video captured by the swivel monitoring unit 402 can act as an input to determine number of rotations performed by the swivel to determine the residual life of the swivel(s) 300. Every frame of the video may contain the swivel(s) 300 (i.e., objects of interest) and plurality of other objects (i.e., background objects) present in the line of sight of the swivel monitoring unit 402. Every frame of the can be considered as an instant of the swivel(s) 300 image. The swivel(s) are the object of interest and the rest are considered to the background objects.

In order to identify the number of rotations (i.e., rotational count/cycles) performed by the swivel(s) 300. The swivel monitoring unit 402 can be configured to transmit the video captured in the line of sight of the swivel(s) to the electronic device. Further, the electronic device can be configured to identify the object of interest (i.e., one or more swivels) in every frame of the video based on a motion estimation. Further, the electronic device can be configured to separate out the background objects present in every frame of the video based on identified object of interest. The swivel(s) are in a continuous motion; thus, the electronic device can perform motion estimation to identify rotating objects (i.e., object of interest/one or more swivels) and stationary objects present in every frame of the video. Further, on identifying the object of interest, the electronic device can be configured to generate a mask image. The mask image highlights only those areas which are in a constant motion, while hiding out a stationary background. In some case, the stationary background may be missing. In such cases, the background object may be erroneously detected as part of the object of the interest.

To eliminate such false positives, a second pass of object recognition technique is used, wherein the masked image is overlaid on every frame of the video to generate an intermediate frame. Further, the electronic device can be configured to identify object of interest in the. To identify the object of interest in the intermediate frame, the electronic device can be configured use an Oriented Fast and Rotated BRIEF (ORB) technique for object of interest recognition. The ORB technique of object of interest recognition involves principle of key-point (i.e., predefined pattern) detection and matching. The Key-point generation is the operation of generating the interest points in every frame of the video. Initially, the ORB technique generates key-points. Further, Harris Corner Detector is applied on the generated key points to retain interesting points which are relevant. Further, on extracting the key points form the intermediate frame. Further, the electronic device can be configured to apply the intermediate frame on every frame of the video and generates corresponding key points. Further, the electronic device can be configured to use a BRIEF descriptor technique to generate descriptors for the corresponding frames for which the key points are generated. Further, the ORB techniques can take care of the rotation invariance, because the object of interest may be oriented in any direction. Further, on detecting the object of interest, the electronic device can be configured to estimate the direction of rotation and velocity of the rotation of the swivel(s). The key point detection and matching (ORB) to localize the swivel(s) in the frames of the video. Further, the electronic device can be configured to count number of rotations performed by the swivel(s) 300 based on the detection of fluctuation/change in key pattern which is obtained through the swivel monitoring unit 402, thereby determines the number of rotations of the swivel(s) 300.

Figure 5:
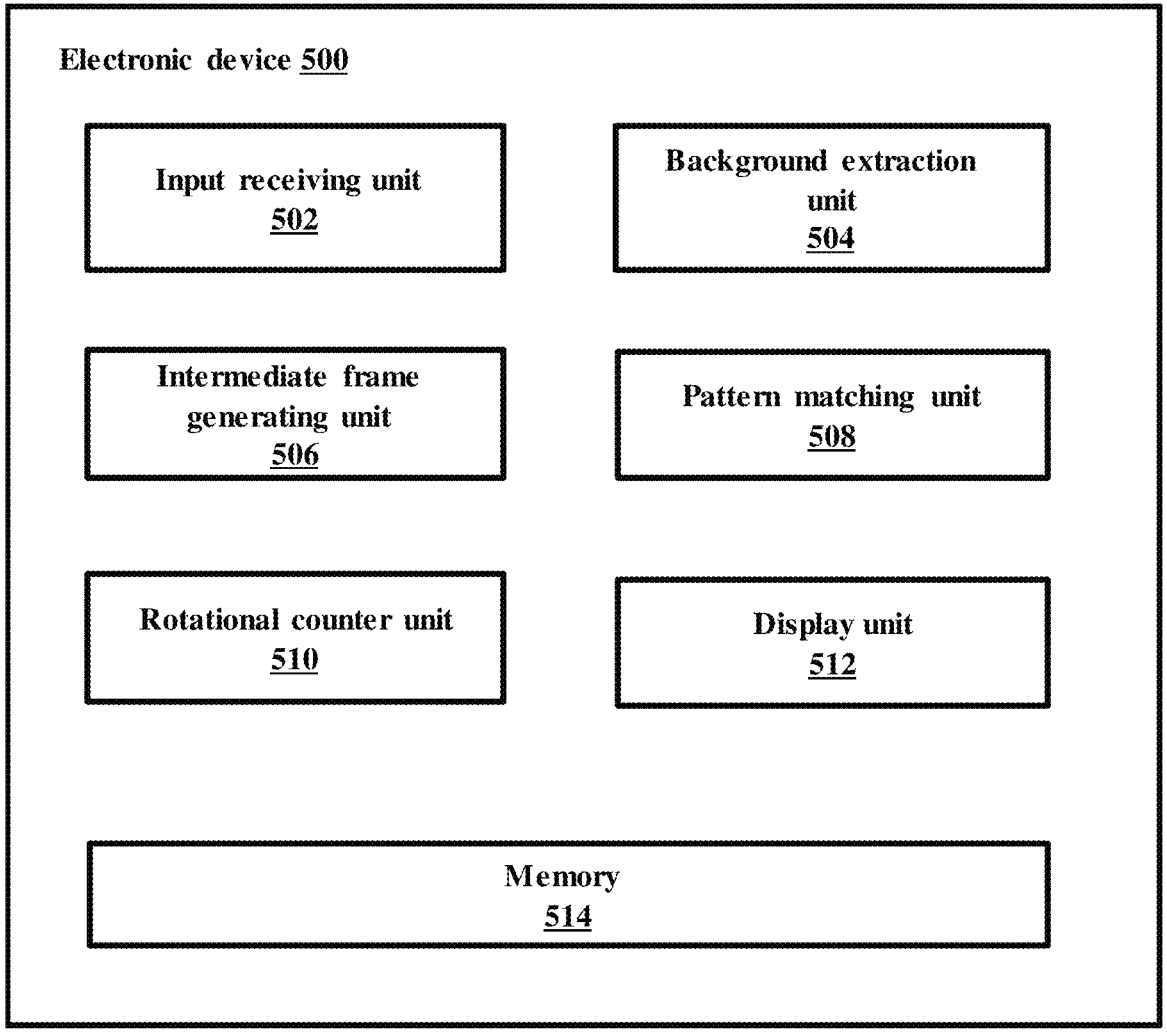
FIG. 5 illustrates various units of an electronic device to determine the residual life of the swivel(s), according to an embodiment as disclosed herein.

FIG. 5 illustrates various units of an electronic device 500 to determine the residual life of the swivel(s) 300, according to an embodiment as disclosed herein.

The embodiments herein provide a method for determining residual life of the swivel by the electronic device 500. In an embodiment, the electronic device 500 can be at least one of, but not restricted to, a mobile phone, a smartphone, tablet, a phablet, a personal digital assistant (PDA), a laptop, a computer, a wearable computing device, an Internet of Things (IoT) device and any other electronic device capable of receiving and processing the input (i.e., video) received from the swivel monitoring unit 402. The electronic device 500 includes an input receiving unit 502, a background extraction unit 504, an intermediated frame generator unit 506, a pattern matching unit 508, a rational counter unit 510 and a display unit 512 and a memory 514.

The input receiving unit 502 can be configured to receive the plurality of frames (i.e. video) of the swivel(s) 300 from the swivel monitoring unit 402. The swivel monitoring unit 402 is placed in line of sight with the swivel(s). Further, the background extraction unit 504 can be configured to generate a mask image for the received plurality of frames to identify at least one moving object in the plurality of frames, wherein the mask image is generated by identifying at least one of at least one stationary object and at least one moving object present in the received plurality of frames. In an embodiment generating the mask image for the received plurality of frames to identify at least one moving object in the plurality of frames includes; determining at least one of the at least one moving object and at least one stationary object present in the received plurality of frames of the swivel(s) and generating the mask image with the identified at least one moving object for the received plurality of frames by subtracting the at least one stationary object in the received plurality of frames. Further, the intermediated frame generator unit 506 can be configured to generate an intermediate frame by overlaying the mask image on at least one frame captured from a live feed of the swivel monitoring unit 402. Further, the pattern matching unit 508 can be configured to detect a predefined pattern (key point) on the intermediate frame to identify an actual object of interest to generate a final mask image, wherein the final mask image includes the actual object of interest. Further, the pattern matching unit 508 can be configured to determining the predefined pattern on every frame of the live feed captured by the swivel monitoring unit by overlapping the generated final mask image on every frame of the live feed. Further, the rational counter unit 510 can be configured to determine rotational count of the swivel(s) 300 based on a pixel intensity variation of the predefined pattern on every frame of the live feed. Further, the display unit 512 can be configured to determine the residual life information of the swivel(s) based on the determined rotational count of the swivel(s) 300, wherein the residual life information includes remaining number rotations for the swivel(s) 300. Further, the display unit 512 can be configured to provide a visual alarm when the swivel(s) 300 is nearing the end of its design life.

The memory unit 514 can be configured to store the plurality of frames (i.e. video) of the swivel(s) received from the swivel monitoring unit 402. Further, the memory unit 514 can be configured to store necessary images/frames (a mask image, intermediate frame and a final mask image) generated by the electronic device 500 to determine the residual life of the at least one swivel. The memory 514 may include one or more computer-readable storage media. The memory 514 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 514 may, in some examples, be considered a non-transitory storage medium. The term "non-transitory" may indicate that the storage medium is not embodied in a carrier wave or a propagated signal. However, the term "non-transitory" should not be interpreted to mean that the memory 514 is non-movable. In some examples, the memory 514 can be configured to store larger amounts of information than the memory. In certain examples, a non-transitory storage medium may store data that can, over time, change (e.g., in Random Access Memory (RAM) or cache).

FIG. 5 shows exemplary units of the electronic device 500, but it is to be understood that other embodiments are not limited thereon. In other embodiments, the electronic device 500 may include one or more number of units. Further, the labels or names of the units are used only for illustrative purpose and does not limit the scope of the embodiments herein. One or more units can be combined to perform same or substantially similar function in the electronic device 500.

Figure 6:
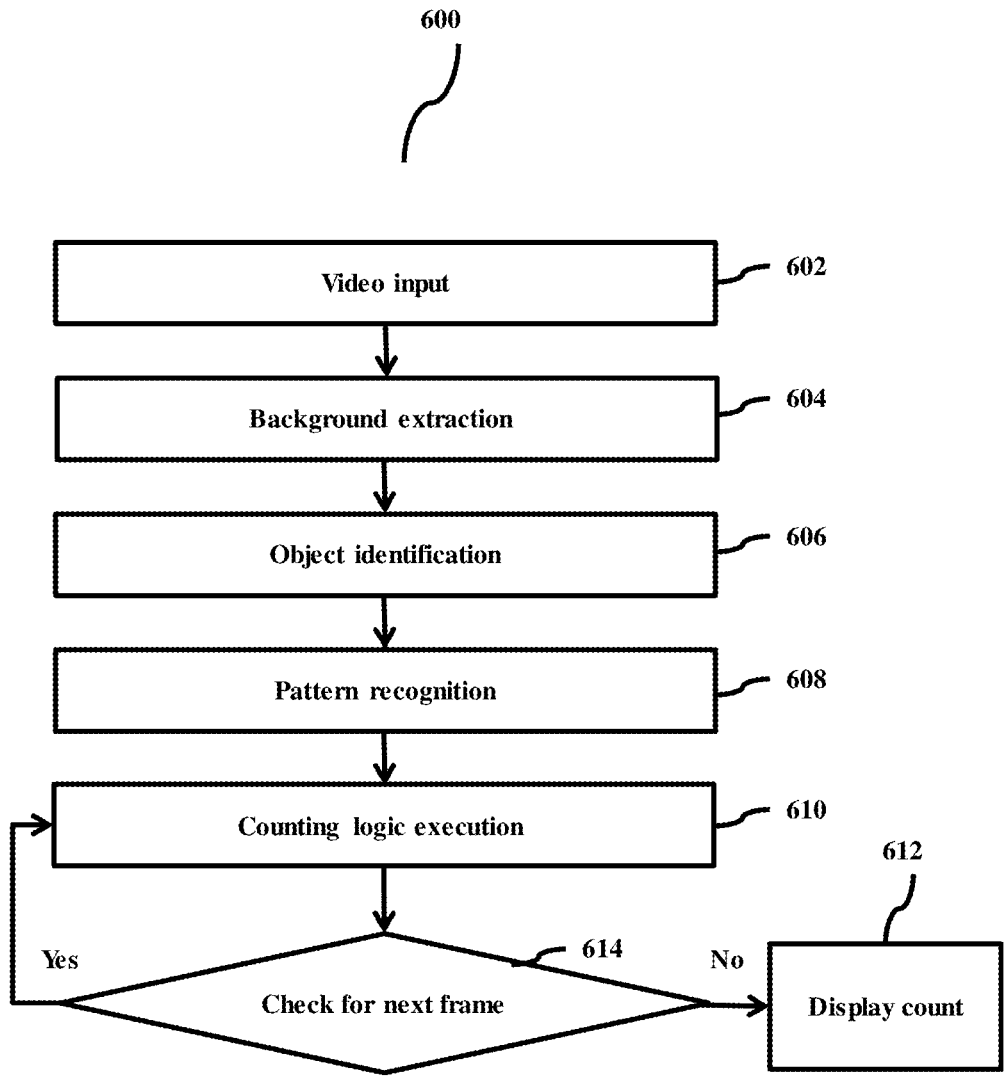
FIG. 6 is a flowchart illustrating a method for measuring/counting rotations of the swivel, according to an embodiment as disclosed herein.

FIG. 6 is a flowchart 600 illustrating a method for measuring/counting rotations of the swivel, according to an embodiment as disclosed herein.

At step 602, the swivel monitoring unit 402 (i.e., camera) records the video of the swivel(s) 300 to determine the rotational count of the swivel(s) 300. Further, at step 604, the video is analyzed to extract an object of interest to separate the rotating swivel(s) 300 from the stationary background. Subsequently, at step 606, the object identification process is carried out by processing the video frames and recognizing the predefined pattern at step 608. Further, at step 610, the rotational count of the swivel(s) 300 is calculated using the underlying counting logic. At step 612, the swivel(s) 300 count is displayed. Further, at step 614, checking for a next frame. If the next frame is available, the process control is moved to step 610 and it continues, otherwise the process stops. Further, the Rotational counter unit 510 can be configured to calculate rotational count of the swivel(s) 300 present in the line of sight of the swivel monitoring unit 402, even if the line of sight is broken between the swivel monitoring unit 402 and the swivel(s) 300. The swivel movement is oscillatory, and the oscillations frequency is variable. The data is assumed to have a constant frequency for the short time, instantaneous frequency estimation for the window from the past few sample data. Therefore, if the line of sight is broken the counting is predicted for that short interval.

The various actions, acts, blocks, steps, or the like in the method and the flow diagram 600 may be performed in the order presented, in a different order or simultaneously. Further, in some embodiments, some of the actions, acts, blocks, steps, or the like may be omitted, added, modified, skipped, or the like without departing from the scope of the invention.

Although the embodiments herein are described with various specific embodiments, it will be obvious for a person skilled in the art to practice the invention with modifications. However, all such modifications are deemed to be within the scope of the claims. It is also to be understood that the following claims are intended to cover all the generic and specific features of the embodiments described herein and all the statements of the scope of the embodiments which as a matter of language might be said to fall there between.

The embodiments disclosed herein can be implemented through at least one software program running on at least one hardware device and performing network management functions to control the elements. The elements shown in FIG. 1 and FIG. 5 can be at least one of a hardware device, or a combination of hardware device and software module.

The foregoing description of the specific embodiments will so fully reveal the general nature of the embodiments herein that others can, by applying current knowledge, readily modify and/or adapt such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

We claim:

1. A method for determining a residual life of a swivel, comprising:
   determining, by a sensor unit, at least one of an angular rotation, a linear displacement, and a rotational direction of at least one swivel, wherein determining the angular rotation of the at least one swivel comprises:
      determining, by a micro controller unit, an orientation of the at least one swivel; and
      determining, by the micro controller unit, an absolute orientation based on a roll, pitch, and yaw of the at least one swivel, wherein the angular rotation of the at least one swivel is determined from the absolute orientation;
   determining, by the micro controller unit, a rotational count of the at least one swivel based on the determined at least one of the angular rotation, the linear displacement, and the rotational direction of the at least one swivel, wherein the rotational count includes at least one of a partial rotation and a complete rotation of the at least one swivel; and
   indicating, by a display unit, residual life information of the at least one swivel based on the determined rotational count of the at least one swivel, wherein the residual life information includes a remaining number of rotations for the at least one swivel.

2. The method as claimed in claim 1, wherein the method further includes indicating, by the display unit, a visual alarm when the at least one swivel is nearing an end of its design life.

3. The method as claimed in claim 1, wherein the method further includes transmitting, by the display unit, the residual life information of the at least one swivel to at least one connected device through a wireless communication.

4. A swivel residual life detector for determining a residual life of a swivel, the swivel residual life detector comprising:
   a sensor unit configured to determine at least one of an angular rotation, a linear displacement, and a rotational direction of the swivel, wherein determining the angular rotation of the swivel comprises determining an orientation of the at least one swivel and determining an absolute orientation based on a roll, pitch, and yaw of the at least one swivel, wherein the angular rotation of the at least one swivel is based on the determined absolute orientation of the at least one swivel;
   a micro controller unit configured to determine a rotational count of the swivel based on the determined at least one of the angular rotation, the linear displacement, and the rotational direction of the swivel, wherein the rotational count includes at least one of a partial rotation and a complete rotation of the swivel; and
   a display unit configured to indicate residual life information of the swivel based on the determined rotational count of the swivel, wherein the residual life information includes a remaining number of rotations for the swivel.

5. The swivel residual life detector as claimed in claim 4, wherein the display unit is further configured to indicate a visual alarm when the swivel is nearing an end of its design life.

6. The swivel residual life detector as claimed in claim 4, wherein the display unit further configured transmit the residual life information of the swivel to at least one connected device through a wireless communication.

* * * * *